United States Patent
Byun et al.

(10) Patent No.: US 10,136,442 B2
(45) Date of Patent: Nov. 20, 2018

(54) METHOD AND APPARATUS FOR ALLOCATING RESOURCES IN WIRELESS COMMUNICATION SYSTEM

(71) Applicant: LG ELECTRONICS INC., Seoul (KR)

(72) Inventors: Ilmu Byun, Seoul (KR); Jaehoon Chung, Seoul (KR); Eunjong Lee, Seoul (KR); Hyeyoung Choi, Seoul (KR); Heejeong Cho, Seoul (KR); Genebeck Hahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 102 days.

(21) Appl. No.: 14/785,560

(22) PCT Filed: Sep. 6, 2013

(86) PCT No.: PCT/KR2013/008077
§ 371 (c)(1),
(2) Date: Oct. 19, 2015

(87) PCT Pub. No.: WO2014/171596
PCT Pub. Date: Oct. 23, 2014

(65) Prior Publication Data
US 2016/0073392 A1 Mar. 10, 2016

Related U.S. Application Data

(60) Provisional application No. 61/813,643, filed on Apr. 19, 2013.

(51) Int. Cl.
*H04W 72/04* (2009.01)
*H04L 5/00* (2006.01)
(Continued)

(52) U.S. Cl.
CPC ......... *H04W 72/048* (2013.01); *H04L 5/0037* (2013.01); *H04L 5/0007* (2013.01);
(Continued)

(58) Field of Classification Search
None
See application file for complete search history.

(56) References Cited

U.S. PATENT DOCUMENTS

2011/0268004 A1 11/2011 Doppler et al.
2012/0224546 A1 9/2012 Chang et al.
(Continued)

FOREIGN PATENT DOCUMENTS

KR 10-2012-0074247 A 7/2012
KR 10-2012-0100833 A 9/2012
(Continued)

*Primary Examiner* — Brandon M Renner
(74) *Attorney, Agent, or Firm* — Birch, Stewart, Kolasch & Birch, LLP

(57) ABSTRACT

Provided are an apparatus and a method for allocating resources in a wireless communication system. In particular, the present invention includes the feature of alternately allocating resources for D2D communication and resources for cellular communication, or allocating resources of a D2D link to not be adjacent to each other. In addition, the present invention prevents interference with the cellular communication and interference with other D2D links by allocating a partial area of the resources allocated for the D2D communication to an area for transmitting a D2D uplink symbol to an eNB, or by adding a GP symbol to a partial area of the resources for the D2D communication. Furthermore, in the case of applying a TDD scheme, the present invention prevents interference with symbols for performing the cellular communication by defining a partial section of a special subframe as a section for transmitting the D2D uplink symbol, or by reflecting a time delay of N OFDM (Continued)

symbol durations. Accordingly, the present invention prevents the D2D communication from causing interference.

10 Claims, 17 Drawing Sheets

(51) Int. Cl.
 *H04L 5/14* (2006.01)
 *H04W 76/14* (2018.01)
(52) U.S. Cl.
 CPC .............. *H04L 5/0066* (2013.01); *H04L 5/14* (2013.01); *H04W 72/0413* (2013.01); *H04W 72/0446* (2013.01); *H04W 76/14* (2018.02)

(56) References Cited

U.S. PATENT DOCUMENTS

| | | | |
|---|---|---|---|
| 2013/0083779 A1 | 4/2013 | Ahn et al. | |
| 2014/0010099 A1* | 1/2014 | Chiu | H04W 72/085 370/252 |
| 2014/0086152 A1* | 3/2014 | Bontu | H04L 1/1812 370/329 |
| 2014/0204847 A1* | 7/2014 | Belleschi | H04W 76/023 370/329 |
| 2014/0328329 A1* | 11/2014 | Novlan | H04W 72/042 370/336 |
| 2015/0215979 A1* | 7/2015 | Nan | H04W 76/023 370/329 |
| 2016/0014589 A1* | 1/2016 | Niu | H04W 74/02 370/329 |

FOREIGN PATENT DOCUMENTS

| | | |
|---|---|---|
| KR | 10-2013-0004926 A | 1/2013 |
| KR | 10-2013-0035964 A | 4/2013 |
| WO | WO 2011/123799 A1 | 10/2011 |

\* cited by examiner

METHOD AND APPARATUS FOR ALLOCATING RESOURCES IN WIRELESS COMMUNICATION SYSTEM

CROSS REFERENCE TO RELATED APPLICATIONS

This application is the National Phase of PCT/KR2013/008077 filed on Sep. 6, 2013, which claims priority under 35 U.S.C. 119(e) to U.S. Provisional Application No. 61/813,643 filed on Apr. 19, 2013, all of which are hereby expressly incorporated by reference into the present application.

BACKGROUND OF THE INVENTION

Field of the Invention

The present invention relates to a wireless communication system and, more particularly, to a method and an apparatus for allocating resources by taking into consideration interference between user equipment (UE) in a wireless communication system for supporting device-to-device communication.

Related Art

In recent years, common use of a long term evolution (LTE) system being a next generation wireless communication system has been actively supported. After a need to support an audio service and a large amount of a service with respect to a request of a user while ensuring activity of a UE user with high quality is recognized, such a LTE system tends to rapidly spread. The LTE system provides low transmission delay, a high transmission rate, system capacity and coverage improvement.

Meanwhile, the LTE system has been developed in the form of maintaining compatibility and coexisting with a 2G communication system, that is, Global System for Mobile Communications (GSM) being time division multiple access (TDMA) based communication technology and a 3G communication system being a wideband code division multiple Access (W-CDMA) based universal mobile telecommunication system (UMTS) in consideration of improvement of a performance gain through improvement of an existing radio access and a network by taking into consideration a request of a service business providing the service to a user.

In particular, recently, as a smart phone and a tablet PC are introduced, real communication UE users require a service capable of easily obtaining or sharing desired information at a desired location and time.

However, up to now, the wireless communication system cannot efficiently provide trivial valuable real time information for the user in a real living space due to a complexity of the system or time delay. Meanwhile, a device to device (D2D) service through a direct communication link between communication UEs is introduced without passing through a network object such as a base station. That is, there is a strong need to suggest, develop/improve a communication technology to support an environment capable of sharing and acquiring various information of users in a wireless communication system environment.

Accordingly, there is a need for an efficient data transmission/reception scheme with respect to a UE to support a service by configuring a link with a base station and UEs to support D2D service in the wireless communication system. Further, there is a need to allocate an efficient resource for minimizing interference upon transmission/reception of data between UEs.

SUMMARY OF THE INVENTION

The present invention provides a method and an apparatus for attenuating interference between symbols upon communication between UEs in a wireless communication system.

The present invention further provides a method and an apparatus for allocating resources to support communication between UEs in a wireless communication system.

The present invention further provides a method and an apparatus for transmitting/receiving uplink control information to support communication between UEs in a wireless communication system.

In order to accomplish the above object, in accordance with an aspect of the present invention, there is provided a method of allocating resource in a wireless communication system, the method including: distinguishing a cellular user equipment (UE) to support cellular communication with an eNB from a device to device (D2D) UE to support D2D communication; and alternately allocating a resource for the cellular UE and a resource for the D2D UE to one frame, wherein the resource for the D2D UE comprises a transmission period of a D2D uplink symbol including control information on the D2D communication.

In accordance with another aspect of the present invention, there is provided an apparatus for allocating resource in a wireless communication system, the apparatus including: a radio frequency unit configured to transmit/receive a wireless signal; and a processor connected to the radio frequency unit, configured to confirm a resource for cellular communication with an eNB and resources for device to device (D2D) communication in one frame, to confirm a transmission section of a D2D uplink symbol including control information on the D2D communication among the resources for D2D communication, and to control to transmit the D2D uplink symbol to the eNB, wherein the resource for cellular communication and the resources for the D2D communication are alternately allocated in the one frame, the D2D uplink symbol comprises feedback information for preventing interference between the resource for cellular communication and the resources for D2D communication.

Advantageous Effects

Interference with symbols is prevented by discriminating and allocating resources to support communication between devices and resources to support cellular communication. Further, the present invention allows a base station to efficiently provide scheduling by taking into consideration service characteristics of UEs in a cell by allocating a partial region of a resource to support communication between UEs. Accordingly, an efficient communication service between UEs is supported through reuse of a frequency in a cellular communication.

In other words, a service request of each UE is satisfied to the highest degree in a wireless environment in which a plurality of UEs and communication devices coexist. That is, the transmission/reception of symbols with respect to a requested service of a corresponding UE is ensured to the highest degree. In this case, the resources allocated for scheduling information for the base station is used as a report section to prevent interference with the UEs in a communication side between the UEs. Accordingly, the performance of the whole system is maximized by preventing degradation in performance of the system due to interference between symbols to support different services.

DESCRIPTION OF EXEMPLARY EMBODIMENTS

Hereinafter, some embodiments of the present invention are described in detail with reference to the accompanying drawings. The same reference denotations are used to refer to the same or substantially the same elements throughout the specification and the drawings. When determined to make the subject matter of the present invention unclear, the detailed description of known configurations or functions is omitted.

The description of the disclosure targets communication networks. The task by a communication network may be done while a system (e.g., a base station) in charge of the communication network controls the network and performs data transmission, or such task may be conducted by a user equipment linked with the network.

Figure 1:
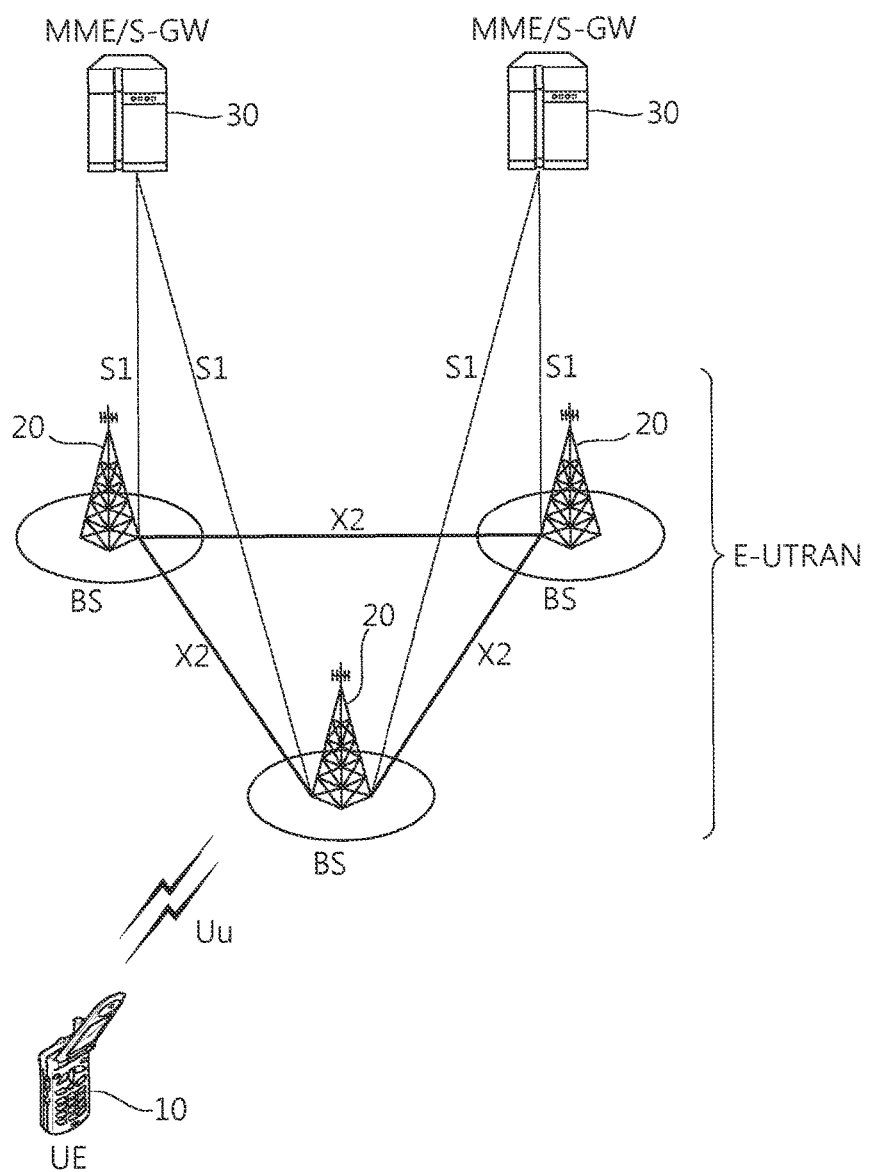
FIG. 1 is a diagram schematically illustrating a configuration of a next generation wireless communication system according to an embodiment of the present invention.

FIG. 1 illustrates a wireless communication system to which the present invention applies. The wireless communication system is also referred to as an E-UTRAN (Evolved-UMTS Terrestrial Radio Access Network) or an LTE (Long Term Evolution)/LTE-A system. Such system is a packet-based system for providing various communication services such as voice or packet data services.

Referring to FIG. 1, the E-UTRAN includes a base station (BS) 20 that provides a control plane and a user plane to a user equipment (UE) 10. The UE 10 may be a stationary or mobile device, and the UE 10 may be referred to as an MS (Mobile Station), a UT (User Terminal), an SS (Subscriber Station), an MT (Mobile Terminal), or a wireless device.

The base station (BS) generally denotes a fixed station that communicates with the UE 10, and the base station (BS) 20 may be referred to as an eNB (evolved-NodeB), a BTS (Base Transceiver System), or an access point. The term "cell" should be interpreted in a comprehensive concept representing a partial region covered by the base station 20, and the term "cell" collectively means various coverage regions including a mega cell, a macro cell, a micro cell, a pico cell, and a femto cell.

Hereinafter, the term "downlink" means a communication from the base station 20 to the UE 10, and the term "uplink" means a communication from the UE 10 to the base station 20. For the downlink, a transmitter may be part of the base station 20, and a receiver may be part of the UE 10. For the uplink, a transmitter may be part of the UE 10, and a receiver may be part of the base station 20.

Various multiple access schemes, without limited thereto, may apply to the wireless communication system according to the present invention. The multiple access schemes may include, but is not limited to, CDMA (Code Division Multiple Access), TDMA (Time Division Multiple Access), FDMA (Frequency Division Multiple Access), OFDMA (Orthogonal Frequency Division Multiple Access), SC-FDMA (Single Carrier-FDMA), OFDM-FDMA, OFDM-TDMA, and OFDM-CDMA. For uplink transmission and downlink transmission, TDD (Time Division Duplex) in which the uplink transmission and the downlink transmission are conducted in different times and FDD (Frequency Division Duplex) in which the uplink transmission and the downlink transmission are performed at different frequencies may be adopted.

Meanwhile, in a case of the LTE system, a high transmission rate is provided to a user by providing an effect logically using one great band by physically binding a plurality of continuous or non-continuous bands in a frequency domain. A technology of using one logical great band by binding a plurality of bands refers to carrier aggregation (CA). Schemes for satisfying a service request of the user by using a plurality of bands for one service or by supporting a service by discriminating respective bands in order to support a corresponding service or using each band by discriminating data and control information.

Base stations 20 may be connected with each other via an X2 interface. Each base station 20 is connected via an S1 interface with an EPC (Evolved Packet Core) 30. Specifically, the base stations 20 are connected with an MME (Mobility Management Entity) via S1-MMEs and with an S-GW (Serving Gateway) via S1-Us. Here, the MME hosts control plane functions, and the S-GW hosts user plane functions.

Figure 2:
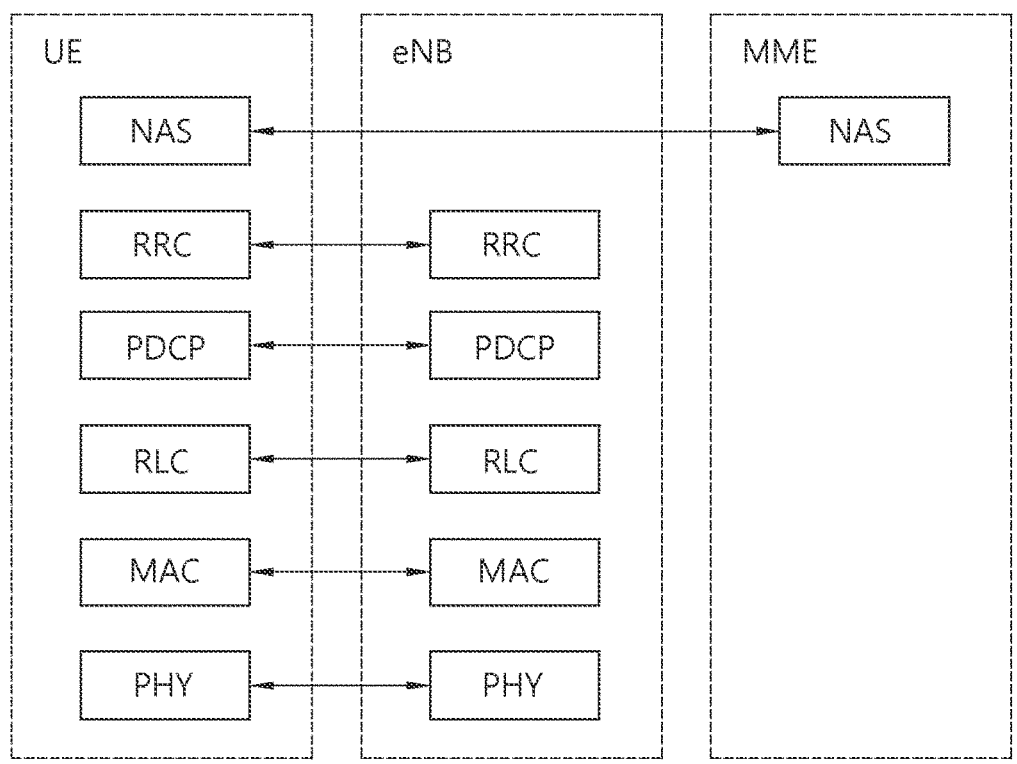
FIG. 2 is a block diagram illustrating a radio protocol architecture for a user plane to which the present invention applies.
Figure 3:
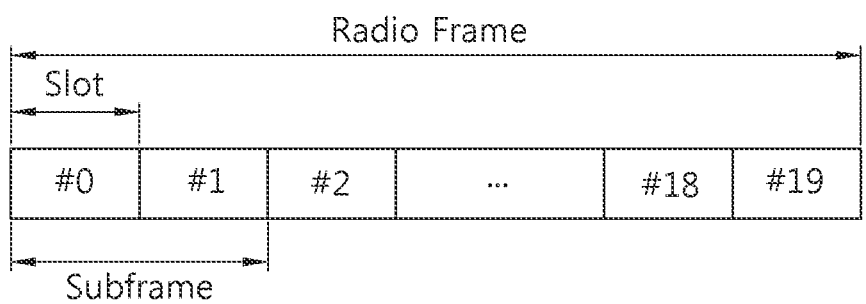
FIG. 3 is a block diagram illustrating a radio protocol architecture for a control plane to which the present invention is applied.

FIG. 2 is a block diagram illustrating a radio protocol architecture for a user plane to which the present invention applies. FIG. 3 is a block diagram illustrating a radio protocol architecture for a control plane to which the present invention applies. The user plane is a protocol stack for transmission of user data, and the control plane is a protocol stack for transmission of control signals.

Referring to FIG. 2, the physical (PHY) layers 210 provide an information transfer service to higher layers using their respective physical channels. The physical layers are connected with the higher layers, medium access control (MAC) layers, via transport channels. The physical channels may be modulated by an OFDM (Orthogonal Frequency Division Multiplexing) scheme, and the physical channel utilize times and frequencies as radio resources.

Hereinafter, fundamental physical control channels will be described. A physical downlink control channel (PD-CCH) may carry resource allocation and delivery format of a Downlink Shared Channel (DL-SCH), resource allocation information of Uplink Shared. Channel (UL-SCH), paging information on a PCH, system information of a DL-SCH, resource allocation of a upper layer control message such as a random access response transmitted on the PDSCH, and an aggregation of transmission power control commands with respect to individual UEs in an optional UE group, and activation of Voice over Internet Protocol (VoIP). A plurality of PDCCHs may be transmitted into a control region. The UE may monitor a plurality of PDCCHs. In addition, the PDCCH is transmitted on one control channel element (CCE) or an aggregation of several continuous CCEs. The CCE represents a logical allocation unit used to provide an encoding rate according to a state of a radio channel. The CCE corresponds to a plurality of resource element groups. A format of the PDCCH and the possible bit number of PDCCHs are determined according to association of the number of CCEs with the encoding rate provided from the CCEs.

A physical control format indicator channel (PCFICH) is transmitted from a first OFDM symbol of a sub-frame. The PCFICH carries information on the number of OFDM symbols (that is, a size of a control region) used to transmit control channels in a sub-frame. That is, the PCFICH reports the number of OFDM symbols used in the PDCCHs to the UE, and is transmitted every sub-frame.

A physical Hybrid ARQ Indicator Channel (PHICH) carries Acknowledgement (ACK)/Not-Acknowledgement (NACK) signals which are a response signal to a Hybrid Automatic Repeat Request (HARQ). That is, the ACK/NACK signals with respect to the uplink data transmitted from the UE is transmitted on the PHICH.

A physical uplink control channel (PUCCH) carries HARQ ACK/NAK with respect downlink transmission and uplink control information such as scheduling request and a CQI. PUSCH (Physical uplink shared channel) 은 UL-SCH (uplink shared channel) 을 나른다 . A physical uplink shared channel (PUCCH) carries a uplink shared channel (UL-SCH).

Meanwhile, functions of the MAC layer 220 includes mapping between a logic channel and a transmission channel, and multiplexing/demultiplexing to a transport block provided on a transmission channel of a service data unit (MAC SDU) included in the logic channel as a physical channel. The MAC layer provides a service data unit (SDU) through the logic channel. The logic channel may be divided into a control channel to transmit control region information and a traffic channel to transmit user region information.

The functions of the RLC layer 230 include concatenation, segmentation, and reassembly of an RLC SDU. In order to ensure various quality of Service (QoS) requested from a radio bearer (RB), the RLC layer provides three operation modes including a transparent mode (TM), an unacknowledged mode (UM), and an acknowledged mode (AM). The AM RLC provides error correction through an automatic repeat request (ARQ).

Functions of a Packet Data Convergence Protocol (PDCP) 240 layer in a user plane include transmission, header compression, and ciphering of user data. The functions of a Packet Data Convergence Protocol (PDCP) include transmission, and ciphering/integrity protection of control plane data.

The RRC layer 250 performs broadcast of system information associated with NAS/AS, paging, RRC connection management, Radio bearer (RB) control, mobility, UE measurement, and the like. In particular, in order to configure, manage, and release the RRC connection between the UE and an E-UTRAN, the RRC layer 250 performs optional identifier allocation and radio resource configuration for the RRC connection. The RRC layer 250 controls the logic channel, the transmission channel, and the physical channel associated with configuration, re-configuration, and release of RBs. Further, the RRC layer 250 performs measurement for mobility between cells and mobility between Radio Access Technologies (RAT), handover between cells, UE cell selection and reselection, context transmission between eNBs, and a mobility function of the UE through a measurement report of the UE.

The NAS 260 layer performs functions such as session management and mobility management.

FIG. 3 shows the structure of a radio frame to which the present invention is applied.

Referring to FIG. 3, a radio frame includes 10 sub-frames, and one sub-frame includes two slots. The time taken for one sub-frame to be transmitted is called a Transmission Time Interval (TTI). For example, the length of one sub-frame may be 1 ms, and the length of one slot may be 0.5 ms.

One slot includes a plurality of OFDM symbols in the time domain and includes a plurality of Resource Blocks (RBs) in the frequency domain. An OFDM symbol is for representing one symbol period because downlink OFDMA is used in 3GPP LTE and may be called an SC-FDMA symbol or a symbol period depending on a multi-access scheme. An RB is a resource allocation unit, and it includes a plurality of contiguous subcarriers in one slot.

The structure of the radio frame is only illustrative, and the number of sub-frames included in a radio frame or the number of slots included in a sub-frame and the number of OFDM symbols included in a slot may be changed in various ways.

Figure 4:
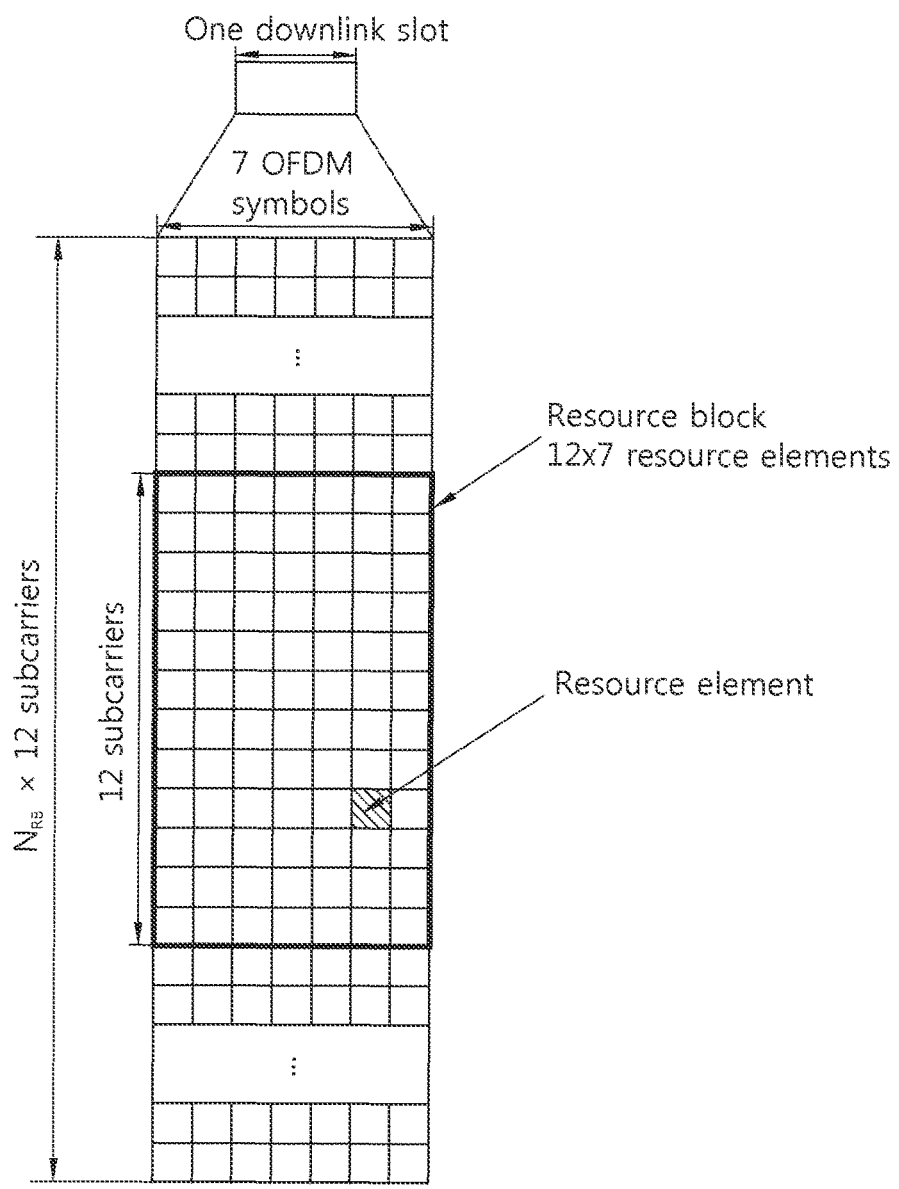
FIG. 4 is an exemplary diagram showing a resource grid for one downlink slot to which the present invention is applied.

FIG. 4 is an exemplary diagram showing a resource grid for one downlink slot to which the present invention is applied.

Referring to FIG. 4, the downlink slot includes a plurality of OFDM symbols in the time domain. Here, one downlink slot is illustrated as including 7 OFDMA symbols and one Resource Block (RB) is illustrated as including 12 subcarriers in the frequency domain, but not limited thereto.

Each element on the resource grid is called a Resource Element (RE). One resource block includes 12×7 REs. The number NDL of resource blocks included in a downlink slot depends on a downlink transmission bandwidth that is set in a cell.

Each element on the resource grid is called a Resource Element (RE). One resource block includes 12×7 REs. The number NDL of resource blocks included in a downlink slot depends on a downlink transmission bandwidth that is set in a cell. Bandwidths that are taken into account in LTE are 1.4 MHz, 3 MHz, 5 MHz, 10 MHz, 15 MHz, and 20 MHz. If the bandwidths are represented by the number of resource blocks, they are 6, 15, 25, 50, 75, and 100, respectively. One or more resource blocks corresponding to each band may be combined to form a Resource Block Group (RBG). For example, two contiguous resource blocks may form one resource block group.

In LTE, the total number of resource blocks for each bandwidth and the number of resource blocks that form one resource block group are shown in Table 1.

TABLE 1

| Bandwidth | Total number of RBs | Number of RBs belonging to one RBG | Total number of RBGs |
|---|---|---|---|
| 1.4 MHz | 6 | 1 | 6 |
| 3 MHz | 15 | 2 | 8 |
| 5 MHz | 25 | 2 | 13 |
| 10 MHz | 50 | 3 | 17 |
| 15 MHz | 75 | 4 | 19 |
| 20 MHz | 100 | 4 | 25 |

Referring to Table 1, the total number of available resource blocks is different depending on a given bandwidth. What the total number of resource blocks differs means that the size of information indicative of resource allocation is different. In addition, the number of cases of allocating a resource block may be changed according to a resource allocation scheme. As an example of the resource allocation scheme, the resource block may be allocated using a bit map type or at a predetermined interval or period. As another example, the resource block may be allocated as a region of a constant continuous length. A resource block allocated to the UE is indicated according to a resource allocation field. In this way, a required amount of a bit in a resource allocation field is changed according to a resource allocation scheme of each type and the total number of resource blocks by bandwidths.

Figure 5:
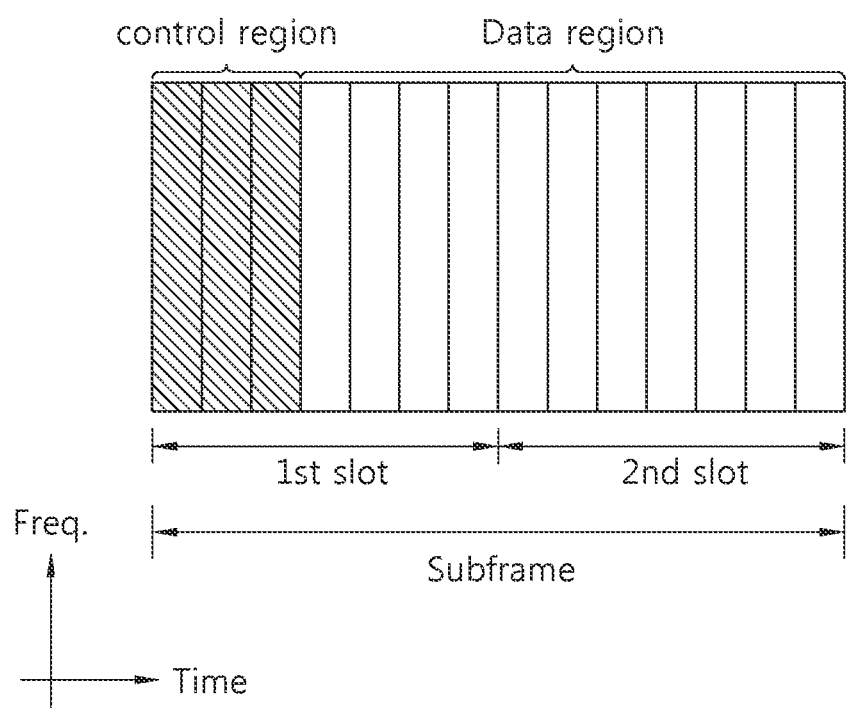
FIG. 5 shows the structure of a downlink sub-frame to which the present invention is applied.

FIG. 5 shows the structure of a downlink sub-frame to which the present invention is applied.

Referring to FIG. 5, a sub-frame includes two slots. The former 2 or 3 OFDM symbols of the first slot within the sub-frame correspond to a control region to which a PDCCH is allocated, and the remaining OFDM symbols thereof become a data region to which a PDSCH is allocated. Downlink control channels include a Physical Control Format Indicator Channel (PCFICH), a Physical Downlink Control Channel (PDCCH), and a Physical Hybrid-ARQ Indicator Channel (PHICH).

Figure 6:
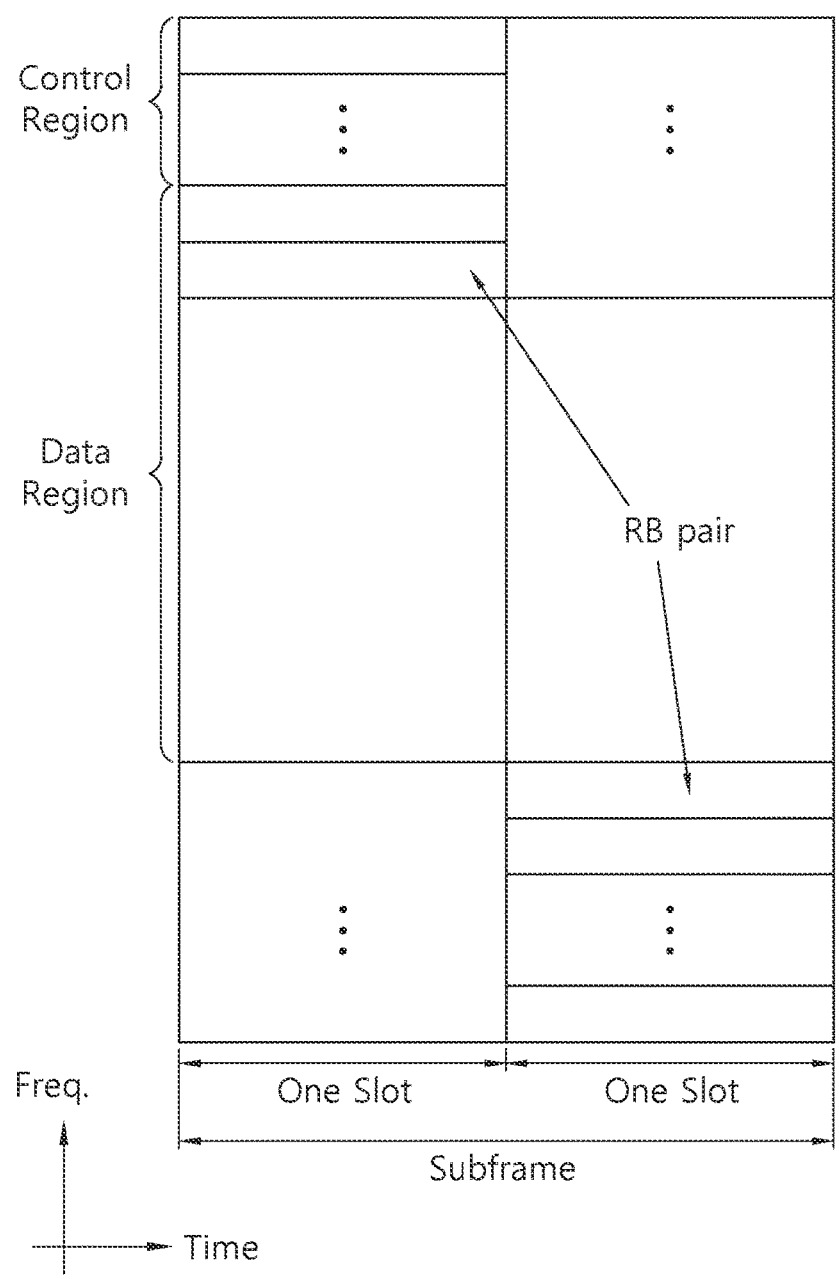
FIG. 6 is a diagram illustrating an example of a structure of a downlink sub-frame according to an embodiment of the present invention.

FIG. 6 is a view illustrating an example of a structure of an uplink sub-frame carrying an ACK/NACK signal to which the present invention is applied.

Referring to FIG. 6, an uplink sub-frame may be divided into a control region to which a physical uplink control channel (PUCCH) that carries uplink control information is allocated, herein, the control information includes an ACK/NACK response of downlink transmission. A data region to which physical uplink shared channel (PUSCH) that carries user data is allocated in the frequency domain. To maintain a single-carrier property, one UE does not simultaneously transmit the PUCCH and the PUSCH. In the sub-frame, a pair of RBs are allocated to the PUCCH with respect to one UE, and the allocated resource block (RB) pair are resource blocks corresponding to different subcarriers in each of two slots. This is called that the RB pair allocated to the PUCCH are frequency-hopped at a slot boundary.

Figure 7:
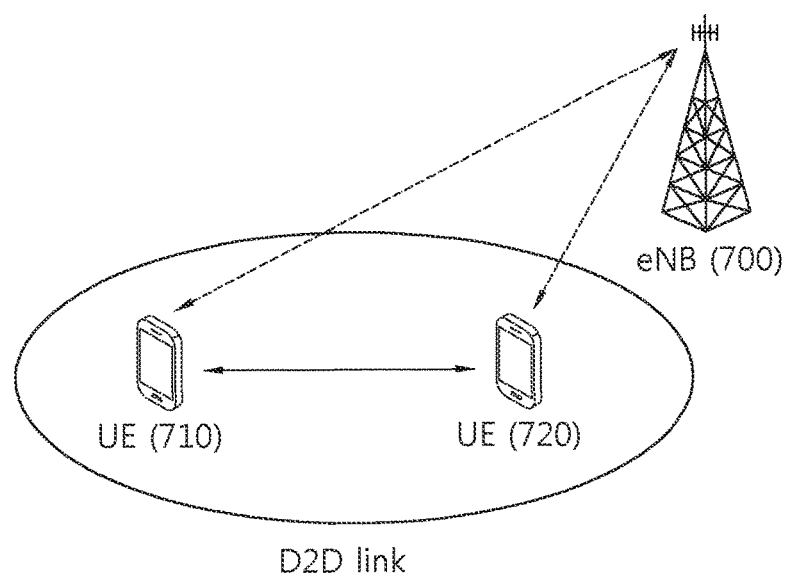
FIG. 7 is a diagram illustrating a concept with respect to communication between UEs according to an embodiment of the present invention.

FIG. 7 is a diagram illustrating a concept with respect to communication between UEs according to the present invention.

Referring to FIG. 7, D2D communication includes a communication scheme for performing transmission/reception of direct data between UEs UE1 and UE2 without through relay of an eNB 700 in a wireless communication system. Based on a cellular infrastructure, the D2D communication equally using a cellular spectrum (frequency) has advantages in various sides.

In particular, if a distance between D2D UEs is close to each other, the UEs directly communicate with each other without passing through the eNB 700 so that a load of the eNB may be reduced, transmission power may be reduced, and a reuse rate of the frequency may be increased. That is, the use of a limited resource is efficient.

Further, in a side of the transmission power, if a distance between UEs is close to each other, since communication is performed in power lower than power when traffic is sent to an eNB which is located away from the UE, a side of the UE is more efficient. Since communication is performed with low power, a plurality of D2D links may simultaneously communicate in the same cell so that the reuse rate of the frequency may be increased.

In particular, the D2D communication according to the present invention takes into consideration LTE protocol based D2D transmission so that the resource is allocated based on the eNB and a scheduling scheme is considered. That is, the eNB includes control authentication with respect to resource allocation of each D2D connection. Information on the scheduled resource is reported to D2D UEs through L1/L2 signaling such as PDCCH. That is, the UEs UE1 and UE2 (710, 720) directly exchange data using an allocated resource under command of the eNB 700. In this case, although all communication may be performed through D2D communication between UEs, real data are transmitted and at least control information associated with data between the UEs. If necessary, transmission/reception of control information and data of the eNB 700 may be supported.

As described above, the D2D link include a communication scheme for synchronizing a time between the UE and the eNB and a communication scheme to configure D2D link without synchronizing with the eNB.

Figure 8:
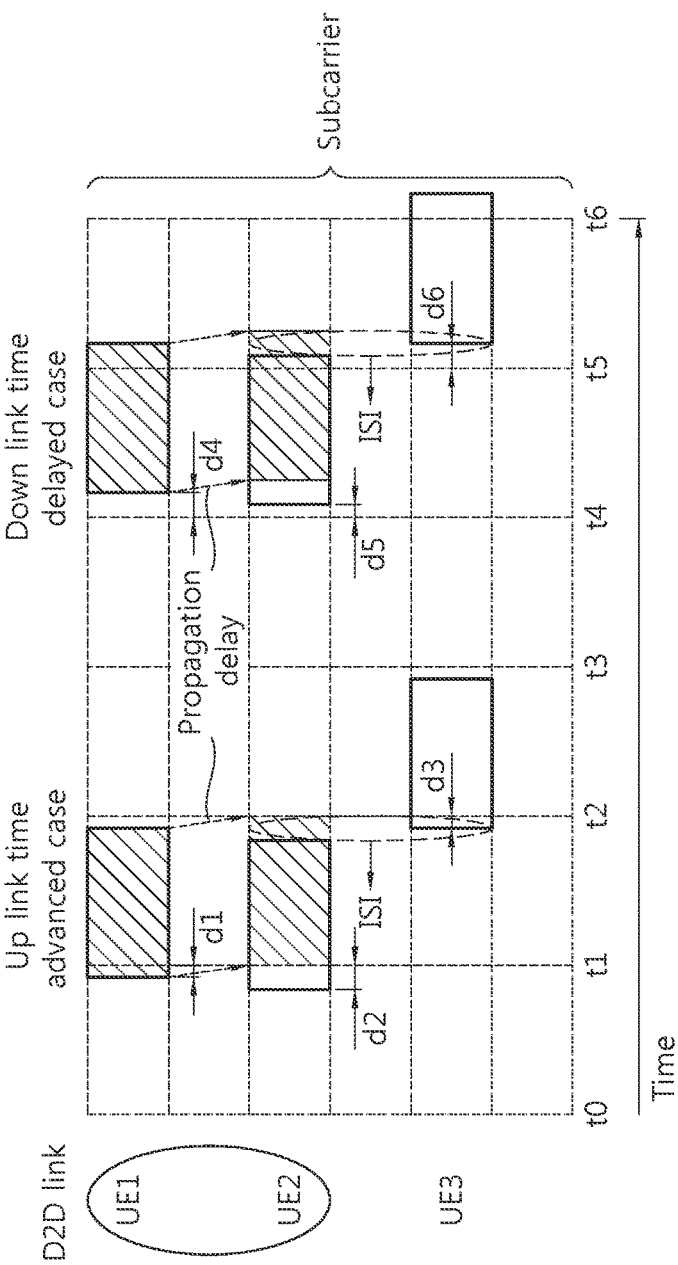
FIG. 8 and FIG. 9 are diagrams illustrating a case of causing interference in a wireless communication environment according to an embodiment of the present invention.
Figure 9:
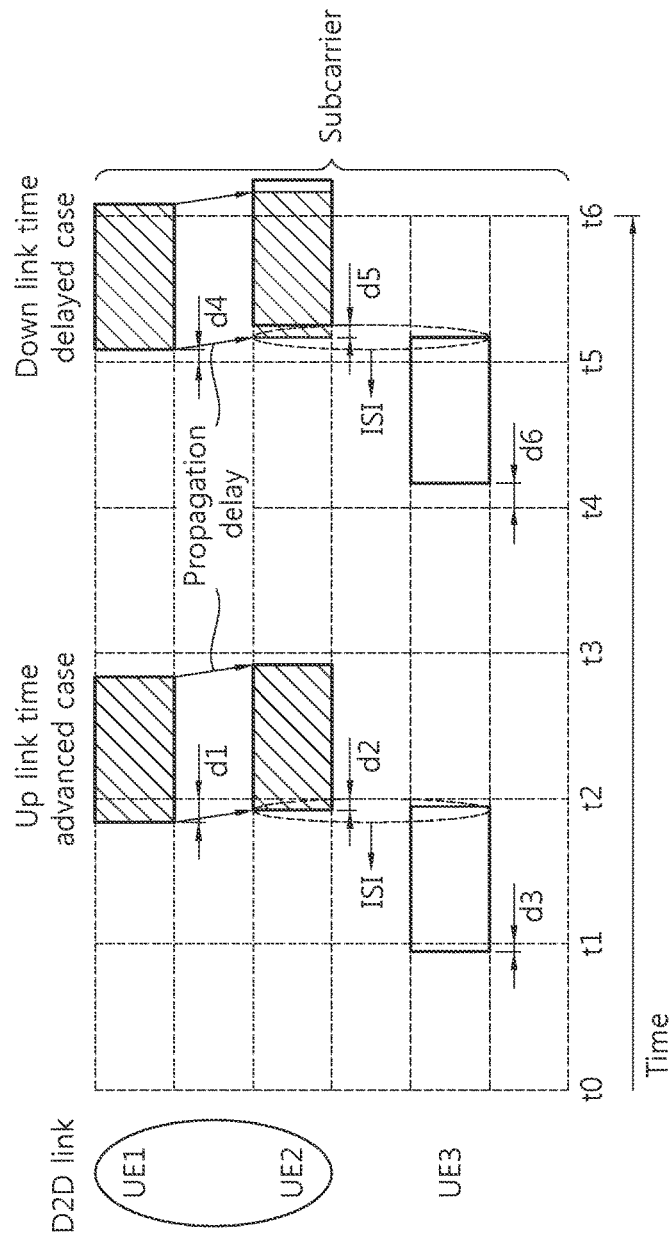

When performing communication by synchronizing a time between the UE and the eNB, inter symbol interference (ISI) may occur due to propagation delay between UEs included in the D2D link and propagation delay between the UE and the eNB. FIG. 8 and FIG. 9 illustrate a situation of the ISI.

FIG. 8 and FIG. 9 illustrate a case of causing interference in a wireless communication environment according to the present invention. FIG. 8 illustrates an environment where interference is caused between a symbol performing D2D communication and a rear symbol performing cellular communication. FIG. 9 illustrates an environment where interference is caused between the symbol performing D2D communication and a front symbol performing cellular communication.

FIG. 8 and FIG. 9 illustrate a situation where UE1 to UE3 use the same sub-carrier. A horizontal dotted line identifies the UE. A vertical dotted line represents RB (or sub-frame or OFDM symbol) synchronizing a time of the eNB. A solid line (box) represents an RB allocated to the UE1 to the UE3. In this case, the UE1 and the UE2 configure the D2D link and optional resource block (RB) for D2D communication is allocated to the UE1 and the UE2. Meanwhile, an RB after the D2D is allocated to the UE3. The UE3 performs uplink/downlink communication with the eNB or the UE3 configures another D2D link with the UE1 (UE2). A position of each symbol is distinguished for the purpose of convenience or clarity. In a case of D2D communication, as a frequency for cellular communication is reused, the D2D communication and cellular communication may be performed in the same sub-carrier (frequency band).

A left side represents an example of an ISI where the UE1 and the UE2 perform D2D communication using uplink RB, and UE3 uses uplink RB. In this case, each UE transmits and receives a signal by synchronizing with an uplink synchronization signal with the eNB. In this way, the UE1 and the UE3 applies timing advance or timing alignment in order to synchronize the uplink signal in the eNB.

Here, as a case where TA(Δd1) of the UE1 is less than TA(Δd2) of the UE2, real D2D communication between the UE1 and the UE2 is performed at an interval t1~t2 due to propagation delay or a TA. In this case, the ISI may be caused between symbols t2-Δd3 of the UE3 performing cellular communication with respect to a reception symbol of the UE2.

Meanwhile, a right side represents an example of the ISI where the UE1 and the UE2 perform D2D communication using a downlink RB, and UE3 performing eNB (or other D2D link) communication uses a downlink RB. In this case, if it is assumed that each UE transmits a signal according to a configured downlink synchronization signal, time synchronization in the UE1 to the UE3 may be delayed as compared with that in the eNB due to propagation delay of the downlink signal. For example, FIG. 8 illustrates a case where propagation delay Δd4 of the UE1 is greater than propagation delay Δd5 of the UE2. In the same manner, when a signal sent from the UE1 is received by the UE2 at a time point of t4+Δd4+PD (Propagation delay) due to the propagation delay, the ISI may be caused due to a signal of a symbol t5+Δd6 received through cellular communication by the UE3.

As another example, referring to FIG. 9, FIG. 9 represents a case where the ISI is caused between a transmission symbol of D2D link and a front symbol communicating with the eNB. A left side of FIG. 9 is an example of ISI where the UE1 and the UE2 performs D2D communication using uplink RB and the UE3 uses the uplink RB. Each UE transmit a signal according to a configured uplink synchronization signal. The left side of FIG. 9 represents an example where TA(Δd1) of the UE1 is faster than TA(Δd2) of the UE2 in a state that the UE1 to the UE3 applied the TA in order to synchronize the uplink signal in the eNB. In this case, the ISI may be caused between a reception symbol of the UE2 and a front symbol t1-Δd3 of the UE3 performing cellular symbol. That is, the cellular communication and D2D are performed at real other time interval. However, due to time delay or an environment according to the TA, interference may be caused at a front region of a symbol at the D2D communication section according to symbol delay with respect to the cellular communication (from t2-Δd3+PD (Propagation delay) to time point t2).

Alternatively, like the right side, it is assumed that each UE transits a signal according to the configured downlink synchronization signal when the UE1 and the UE2 perform the D2D communication using a downlink RB and the UE3 uses the downlink RB. The left side of FIG. 9 represents a situation where the time synchronization in the UE1 to the UE3 is delayed as compared with the eNB due to the propagation delay of the downlink signal. When the propagation delay of the UE1 is less than that of the UE2, in the same manner, when the UE2 receives the signal sent from the UE1, a signal received by the UE3 may be operated as the ISA.

In addition, when the D2D link performs the communication without synchronizing with the eNB, the ISI between the UE included in the cellular communication and D2D communication UEs may be easily and frequently caused as compared with a case illustrated in FIG. 8 and FIG. 9. For example, in FIG. 8 and FIG. 9, the TA is applied to the D2D link by the UE1 and the UE2 by synchronizing with the eNB. Resource allocation partially adjusted by the eNB may be achieved. However, in a case of performing D2D communication without control of the eNB, a probability of causing the ISI from the same symbol may be increased. Even if a different symbol performs communication, the D2D transmission/reception is performed at a resource section when no information on the TA and the like is considered, that is, is confirmed so that more serious ISA may be caused as compared with that illustrated in FIG. 8 and FIG. 9.

The above ISI causes performance degradation in both of the D2D UEs and the cellular UEs so that the communication service cannot be suitably supported. In this way, the present invention discloses a resource allocation scheme to prevent the ISI and a scheme of more efficiently scheduling the eNB.

In particular, the present invention discloses a scheme of transmitting an uplink control signal for D2D communication of the UE. The present invention may include a scheme of allocating a frequency resource of an allowed band of the UE for D2D communication distinguished with a frequency resource for the cellular UE or signaling including providing, requesting, and feedbacking the allowed band for the D2D communication to a service provider or the eNB.

Figure 10:
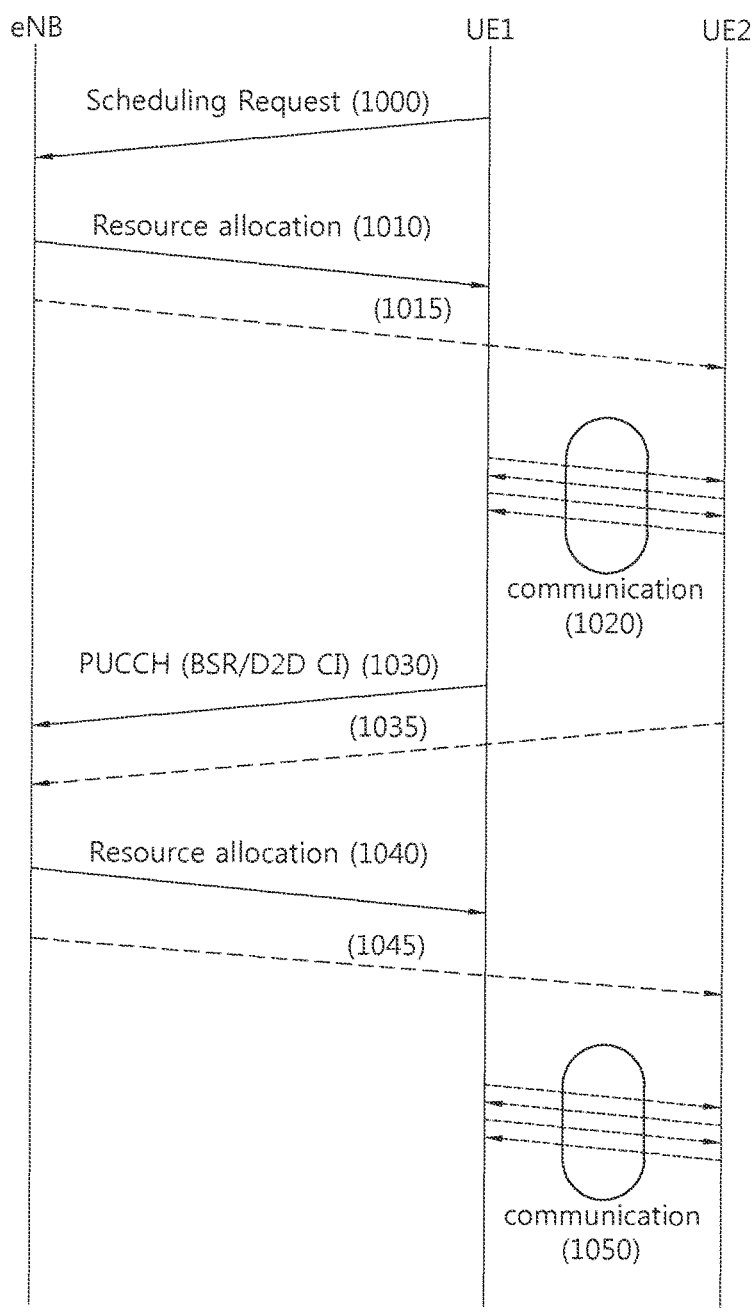
FIG. 10 is a signaling flowchart for performing D2D communication according to an embodiment of the present invention.

FIG. 10 is a signaling flowchart for performing D2D communication according to an embodiment of the present invention.

Referring to FIG. 10, UE1 requests communication with UE2 to the eNB 1000. The request may be transmitted to the UE1 by the eNB, and may be directly transmitted to other UE from the UE1. The request includes a configuration to transmit/receive data between UEs without the request due to a contention-based request such as the above request.

The eNB performs resource allocation (or bandwidth/grant) for downlink, uplink, or downlink/uplink for D2D communication to the UE1 and the UE2 (1010, 1015).

Steps 1010 and 1015 include a procedure where the eNB inquires D2D intention to the UE2, and responds the result to the UE1. Alternatively, a step of requesting communication with the UE1 to the eNB by the UE2 and inquiring the above D2D intention to the UE2 to respond may be omitted from step 1000.

Further, signaling with respect to D2D communication may include indication with respect to D2D. That is, presence of possibility of D2D communication may be indicated in on/off form. The indication with respect to the D2D may include information on a specific UE requested by the UE1. Alternatively, the indication may include information on candidate UE(s) communicating with the UE1 and selectively includes an on/off indicator with respect to D2D communication possibility by corresponding UEs.

Meanwhile, resource allocation for the UE1 and the UE2 may be independently signaled to each UE, and may be solved as common signaling. In addition, the resource allocation includes a resource configured by a frequency or a time for D2D communication with respect to the UE1 and the UE2, and a combination of the frequency and the time. Moreover, the resource may include a predetermined length of a symbol and is allocated to be spaced so that interference is not caused between symbols according to D2D communication or a resource for the D2D or a resource for cellular communication may be alternatively allocated. Alternatively, a resource including a predetermined length of a guard symbol taking into consideration time delay or cell interference may be allocated to the resource for D2D communication. That is, according to the present invention, the eNB confirms a plurality of service possible UEs in a cell, and may distinguish the UE to support D2D communication from the UE to support cellular communication through capability of the confirmed UEs. Furthermore, a resource for distinguished D2D communication with respect to the distinguished UE may be allocated.

Accordingly, the UE1 and the UE2 perform direction communication through the allocated resource (1020). In this case, the D2D UEs transmit/receive data without control (participation) of the eNB. That is, the UEs perform direct communication while minimizing unnecessary communication.

In this case, the UE1 (or UE2) may transmit a D2D uplink symbol through some of resources allocated by the eNB for the D2D communication (1030, 1035). This means transmission of at least control information to the eNB from the UE in order to efficiently prevent ISI and the like between D2D communication symbols or between the D2D communication symbol and the cellular communication symbol, that is, to efficiently schedule the eNB. The D2D uplink symbol is a symbol to be transmitted to the eNB from the UE 1 in order to prevent interference between a symbol for the D2D communication and a symbol for cellular communication among symbols allocated for the D2D communication by the eNB.

That is, as uplink transmission to the eNB in a sub-frame (or frequency band (sub-carrier)/OFDM symbol) for the D2D communication, the interference is not caused in the D2D uplink symbol in a real other D2D communication symbol and the D2D uplink symbol may be transmitted to the eNB. The resource allocation for the UE1 and the UE2 at step 1010 (1015) may include resource allocation with respect to uplink transmission for transmitting uplink control information for D2D communication with the eNB by the UE. A frame structure for transmitting the D2D uplink symbol will be described in detail with reference to FIG. 11 to FIG. 16.

According to an embodiment of the present invention, the D2D uplink symbol may include following uplink control information.

1. The D2D uplink symbol may include information for reporting a communication state of the D2D to the eNB. The information on the communication state of the D2D may include a) information on whether to continue of the D2D communication or b) information necessary to allocate a resource for the D2D.

The a) information on whether to continue communication of the D2D (D2D Continuity Indicator) may include information on a buffer state and start/end of the D2D communication associated with the D2D communication. Further, the start/end of the D2D may be induced through a buffer status report (BSR) with respect to D2D communication. When a plurality of D2D links are configured in a corresponding UE, BSR information corresponding to each D2D link and/or information on start/end may be transmitted.

The b) information necessary to allocate the resource for the D2D may include information on a currently used channel in which the D2D link is configured and state information of a channel with respect to a candidate link in which the D2D link is configured. The b) information necessary to allocate the resource for the D2D may include a Channel Quality Indicator (CQI), a Preceding Matrix Index (PMI), a Rank Indicator (RI), and the like for estimating the downlink channel quality. As another example, a sounding reference signal (SRS) is transmitted to an uplink channel by the UE1 and a channel state of the uplink is confirmed from the SRS, the resource for the D2D may be scheduled. Alternatively, the eNB may receive information for requesting resource change of the D2D link from the UE. When request information for the D2D link is received by the eNB and a requested resource is allowed, the resource may be allocated including information of time and frequency resource in which the D2D link is changed.

Further, the information for reporting the communication state of the D2D to the eNB may be used in a handover request procedure. When the UE of the D2D is in a connected mode with respect to the eNB, the D2D communication is continuously by transmitting the communication state of the D2D to the eNB in a partial or whole procedure of handover. Meanwhile, when the UE of the D2D is in an idle state with respect to the eNB, in order to perform cell (re)selection procedure, the UE of the D2D may transmit the communication state of the D2D including information on the eNB in which the UE is included or a management result with respect to the D2D link. That is, the UE of the D2D may transmit the communication state of the D2D including a management result of a D2D link measured through the handover procedure and a peripheral D2D link and information for estimating a channel state to the eNB. In this case, the UE of the D2D may transmit the communication state of the D2D through the allocated D2D resource.

Meanwhile, information for changing D2D communication to cellular communication may be included. For example, after a channel state between the UE and the eNB is tracked through the reference signal (RS), it may be determined so that the D2D communication is changed to communication passing through the eNB. Further, stop/continuation of the D2D communication may be controlled by estimating an uplink channel state through the SRS.

Further, the UE may alternately transmit channel information on the D2D communication and channel information on the cellular communication by setting a transmission period of a D2D uplink symbol. In this case, since the channel information on the D2D communication and the channel information on the cellular communication are alternately transmitted, the channel information on the D2D communication and the channel information on the cellular communication may be transmitted without additional indication (signaling) for distinguishing the channel information on the D2D communication from the channel information on the cellular communication are alternately transmitted. Alternatively, since the D2D uplink symbol is transmitted through a resource through the D2D communication, the eNB may distinguish D2D uplink control information from uplink control information on the cellular communication without a separate identifier. Alternatively, channel information on a corresponding supported service by taking into consideration the wireless environment may be transmitted while marking the channel information. For example, after marking the D2D communication and the cellular communication with 1 and 0, corresponding channel information may be transmitted. Alternatively, the D2D communication and the cellular communication are sequentially indicated in a bit map form and may be transmitted including a management result.

Scheduling is performed in consideration of usable resources by confirming an eNB receiving a D2D uplink symbol through the D2D communication resource and the D2D communication UE and cellular communication UE including the UE1. In addition, the resource allocated according to scheduling in consideration of a communication state in the cell is transmitted to a corresponding UE (1040, 1045). Accordingly, the UE1 and the UE2 perform direction communication between UEs using the allocated resource (1050). In this case, the resource for the D2D communication may be changed and may be the same as a previous resource.

As described above, communication time/order and UL/DL time/order of the UE1 and the UE2 with the eNB, and communication time/order and UL/DL time/order between UEs are illustrative for the purpose of convenience, and the order may be changed or omitted according to scheduling of the eNB, a state of each UE, and a transmission amount of each UE. Further, signals such as additional control and management may be transmitted/received between the UE and the eNB and between UEs.

Figure 11:
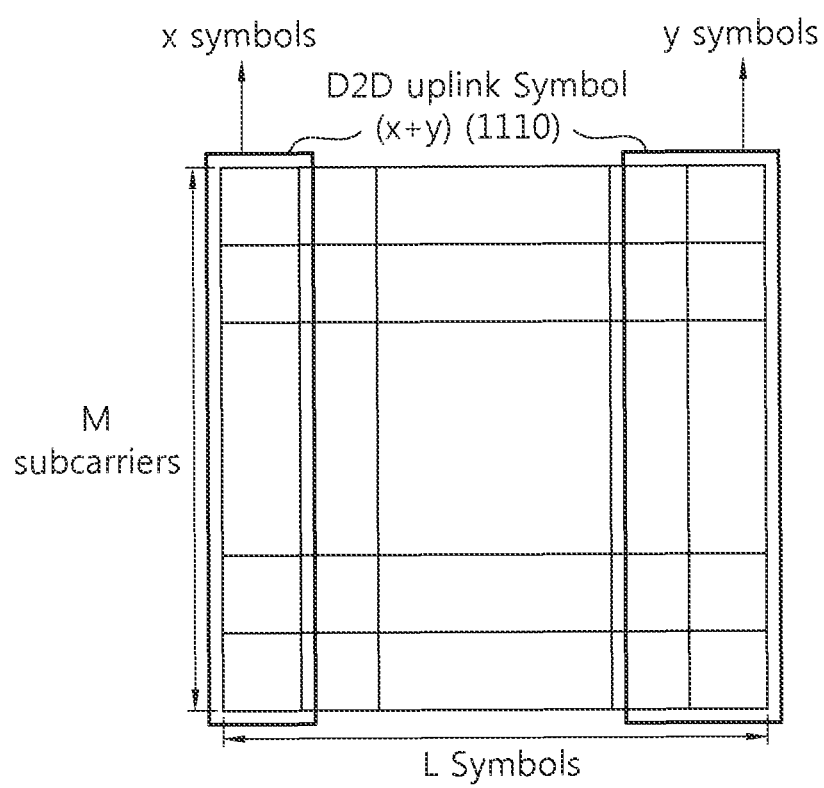
FIG. 11 is a diagram illustrating a structure of a frame for D2D communication according to an embodiment of the present invention.

FIG. 11 is a diagram illustrating a structure of a frame for D2D communication according to an embodiment of the present invention.

Referring to FIG. 11, according to an embodiment of the present invention, the resource for the D2D is defined by L symbols. In this case, the L symbols may be some of the resources for cellular communication but may include reused resources for D2D. Alternatively, the L symbols may include D2D spaced communication resources having a predetermined interval by distinguishing the D2D communication with cellular communication.

N OFDM symbols among the allocated resource (L symbols) are defined as a D2D uplink symbol 1110 for transmitting a request and a state of the D2D to the eNB. Among the N OFDM symbols, x symbols are a first symbol in the time among predetermined symbols of a predetermined sub-frame, and y symbols N-x is defined as a last symbol in the time. In this case, N∈{1, 2, . . . }, x∈{0, 1, 2, . . . , N}, and the M represents the number of sub-carriers allocated for the D2D communication. Transmission power and a modulation scheme of a resource (symbols) for the D2D communication, that is, the D2D uplink symbols 1110 may be differently set as values different from that of symbols for the cellular communication.

Further, the L symbols may be a unit which is the same as, greater than, or less than a slot length or a length of the sub-frame. An M sub-frame may be one RB unit and greater or less.

That is, the present invention defines a partial symbol among allocated D2D resources upon allocating the resource for D2D as a region for transmitting control information to an eNB for D2D scheduling. Accordingly, the eNB performs and confirmed determination for minimizing interference between the resource for the D2D communication and a resource for cellular communication through a D2D uplink symbol transmitted from a corresponding UE of the defined region.

Figure 12:
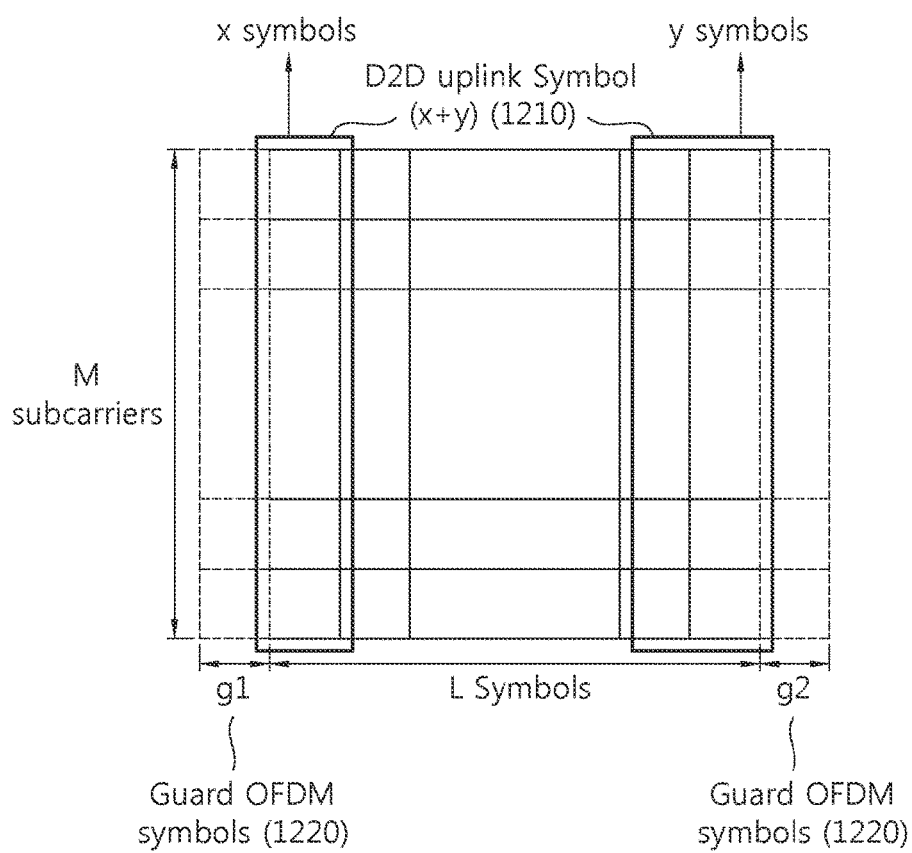
FIG. 12 is a diagram illustrating a structure of a frame for D2D communication according to another embodiment of the present invention.

FIG. 12 is a diagram illustrating a structure of a frame for D2D communication according to another embodiment of the present invention.

Referring to FIG. 12, a frame for D2D communication has a frame structure similar to that illustrated in FIG. 10. In particular, N OFDM symbols (x+y) among L symbols allocated for D2D communication are defined as a D2D uplink symbol 1210. The frame for D2D communication includes at least one guard OFDM symbol 1220 before or after the D2D uplink symbol. In FIG. 12, the guard OFDM symbol 1220 may be defined as g1 and g2 of different lengths or the g1 and the g2 may have the same length.

For example, if it is assumed that the UE transmits a part of resources allocated for the D2D communication, the UE2 is a UE1 tx resource for reception, the UE2 transmits a remaining resource, and the UE1 is a UE2 tx resource for reception, when the frame for D2D communication has a frame structure as illustrated in FIG. 11, the UE1 tx resource and the UE2 tx resource should not be continuously allocated in the time by taking into consideration interference.

However, in a case where the frame for D2D communication has a frame structure as illustrated in FIG. 11, when the UE1 tx resource and the UE2 tx resource are continuously allocated in the time, the frame for D2D communication is applicable. That is, the generation of the interference is minimized due to the guard OFDM symbol 1220, the UE may transmit D2D control information to the eNB through a D2D uplink symbol including the guard OFDM symbol.

As described above, the eNB transmits/receive a signal according to time synchronization with a plurality of UEs in the wireless communication system based on LTE/LTE-A. In this case, each UE reflects time advance (TA) by taking into consideration the propagation delay to transmit the signal. If the UE1 transmits the signal according to uplink time synchronization at the allocated uplink resource, the ISI may not be caused in the eNB receiving the above signal or the ISI may be disregarded. The ISI may be caused in the UE2 receiving a transmission signal to the eNB. If the UE1 and the UE2 forms the D2D link and the UE1 sends uplink information so that the eNB may control and manage D2D link, the UE2 does not need to receive corresponding information. Accordingly, a symbol including corresponding information may be used as a guard symbol for preventing ISI caused when the UE2 receives a symbol of the UE1.

Referring back to FIG. 8, a generation environment of the ISI will be described. According to the present invention, the UE1 may arrange a symbol including information to be sent to the eNB in N last OFDM symbols. That is, the D2D uplink symbol may be set as N=y. In this case, since the UE2 does not need to decode next N OFDM symbols, it is not necessary to consider the ISI caused in corresponding symbols. Further, the ISI is not caused in remaining OFDM symbols of a next sub-frame to be decoded by the UE2. That is, the D2D uplink symbol (N=y) is D2D relation control information to be transmitted to the eNB from the UE1, and allows the eNB to induce more efficient scheduling for D2D link.

Referring back to FIG. 9, a generation environment of the ISI will be described. The UE1 may arrange a symbol including information to be sent to the eNB in first N OFDM symbols. That is, the D2D uplink symbol may be set as N=x. In this case, since the UE2 does not need to decode previous N OFDM symbols, it is not necessary to consider the ISI caused in corresponding symbols with respect to the cellular communication. Further, the ISI is not caused in remaining OFDM symbols of a next sub-frame to be decoded by the UE2. That is, through the D2D uplink symbol N=x, scheduling for D2D link of the eNB is induced.

In addition, the UE1 may load information to be sent to the eNB in the first x OFDM symbols and the last y OFDM symbols. This is applicable when a TA of each UE cannot be known in order to configure the D2D link. Accordingly, the UE2 does not need to decode N OFDM symbols including previous x symbols and next y symbols, there is no need to consider the ISI caused in corresponding symbols. Further, the ISI is not caused in remaining OFDM symbols to be decoded by the UE2.

In addition, as illustrated in FIG. 12, information to be sent to the eNB is loaded in first N OFDM symbols, and last OFDM symbols are not used, and a guard period may be provided. In this way, the D2D uplink signal may be prevented from being degraded due to interference of the sounding reference signal (SRS) from a last OFDM of a sub-frame sent from other UEs in uplink.

As described above, there has been suggested a scheme of reducing ISI by distinguishing an OFDM symbol for data communication between D2D UEs among L reset symbols from the D2D uplink symbol and a scheme of allocating a resource by determining whether a generation symbol of the ISI is for the D2D UE or for cellular UE.

Figure 13:
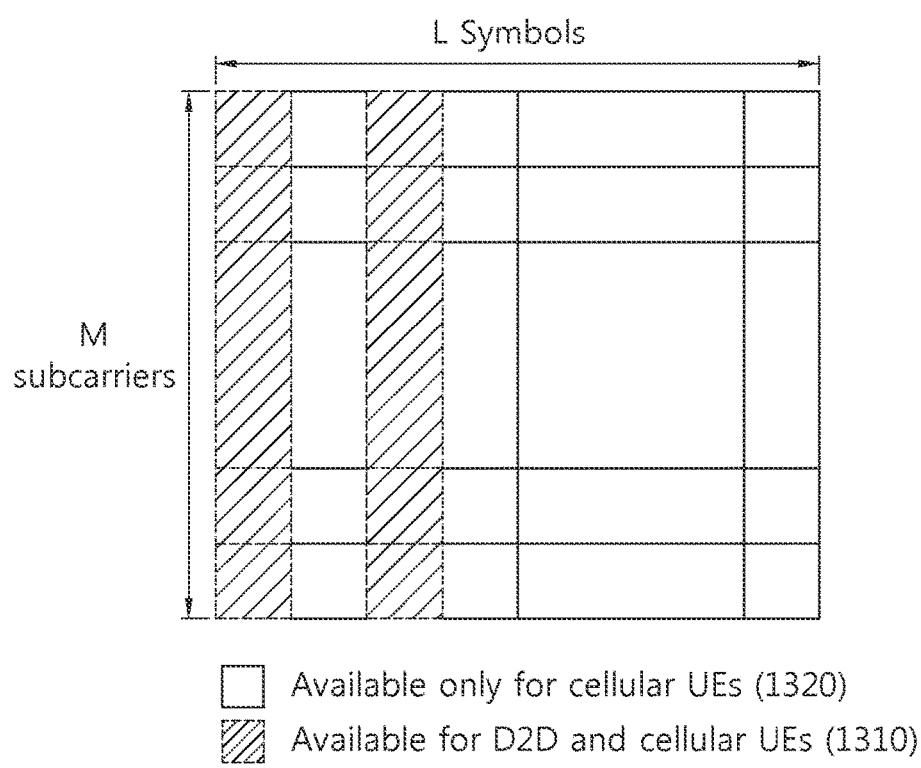
FIG. 13 is a diagram illustrating a structure of a frame for D2D communication according to another embodiment of the present invention.

FIG. 13 is a diagram illustrating a structure of a frame for D2D communication according to another embodiment of the present invention.

Referring to FIG. 13, resources are alternately allocated by distinguishing a resource 1310 for the D2D communication from a resource 1320 for the cellular communication. In this case, the resource for the D2D communication may be allocated to the UE for the cellular communication.

For example, an odd numbered symbol may be allocated as an available resource for the UE to support the D2D communication. In this case, UEs for supporting the D2D communication is UE performing the cellular communication, and includes UE for additionally supporting D2D communication according to characteristics of the UE. Meanwhile, an even numbered symbol may be allocated as an available resource for UE to perform cellular communication. Alternatively, the odd numbered symbols may be used as a resource for UE performing the cellular communication or the even numbered symbols may be used as a resource for UE performing the D2D communication. That is, an OFDM symbol having a length determined as a resource for D2D communication is alternately allocated to a resource for supporting only the cellular communication to have a predetermined interval.

Accordingly, since the eNB allocates resources by distinguishing the resource for the D2D communication with the resource for the cellular communication, in the case of the UE for performing the D2D communication, interference between symbols may be prevented from being generated due to the TA or the propagation delay. In particular, upon scheduling, the eNB allocates the resource so that resources for the D2D link are not close to each other. Accordingly, the interference between the D2D symbols is prevented.

As described above, the wireless communication system according to the present invention may support both of an FDD and a TDD. As described above, in a case of the FDD, uplink transmission and downlink transmission may be simultaneously performed in the cell by distinguishing a frequency of a carrier used for the uplink transmission with a frequency of a carrier used for the downlink transmission. In the meantime, in a case of the TDD, the uplink transmission is distinguished from the downlink transmission in the time based on one cell. Since the same carrier is used for the uplink transmission and the downlink transmission, the eNB and the UE repeat switch between a transmission mode and a reception mode. With respect to this, the present invention suggests a scheme of allocating a resource for performing the D2D communication by taking into consideration characteristics of a TDD frame.

Figure 14:
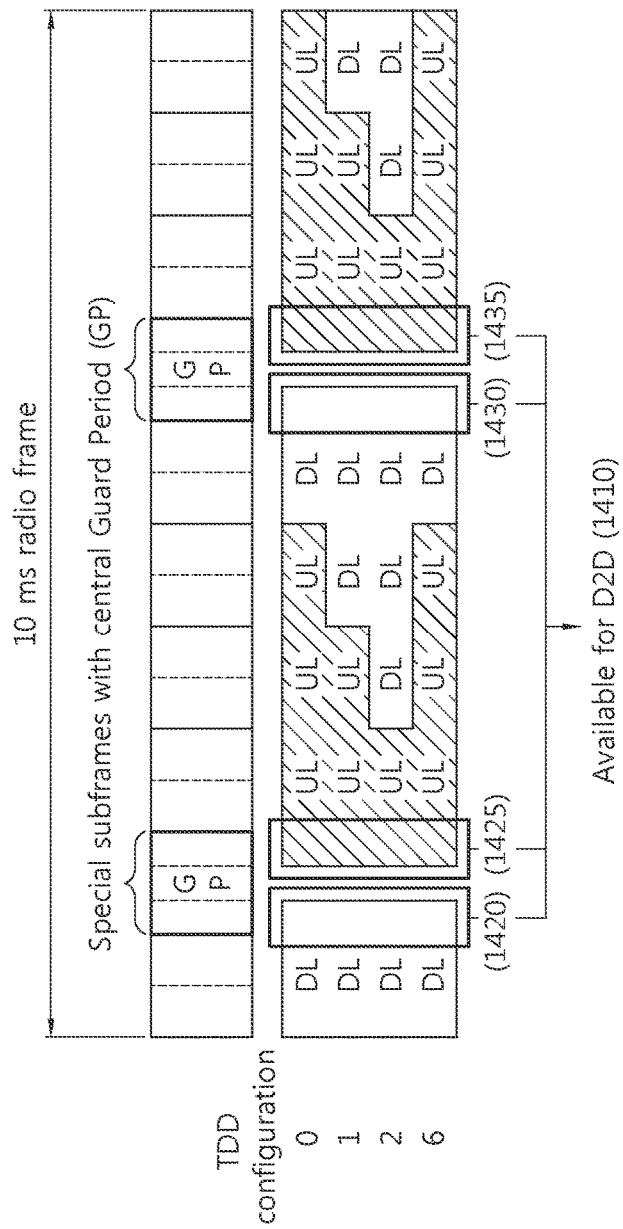
FIG. 14 is a diagram illustrating a structure of a frame for D2D communication in a TDD system according to another embodiment of the present invention.

FIG. 14 is a diagram illustrating a structure of a frame for D2D communication in a TDD system according to another embodiment of the present invention. In particular, FIG. 14 illustrates resource allocation for the D2D communication in the TDD system.

As shown in FIG. 14, a LTE system for supporting the TDD scheme includes a downlink sub-frame D, a uplink sub-frame U, and a special sub-frame S in a frame structure configured by 10 sub-frames. A guard time may be provided upon switching between a transmission mode and a reception mode based on the special sub-frame S. Meanwhile, a following table 2 lists configuration of uplink and downlink in the TDD mode.

TABLE 2

| Uplink-downlink configuration | Downlink to uplink Switch-point periodicity | 0 | 1 | 2 | 3 | 4 | 5 | 6 | 7 | 8 | 9 |
|---|---|---|---|---|---|---|---|---|---|---|---|
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Accordingly, the UE receiving a corresponding index from the eNB performs communication through an uplink/downlink frame defined according to the uplink-down link configuration listed in the table 2. An asymmetrical transmission resource for uplink transmission and downlink transmission may be allocated through the uplink/down link configuration. In addition, the uplink-down link configuration used between the eNB and the UE may not be dynamically changed. For example, the eNB and the UE performing the uplink/down transmission by a configuration 2 do not perform the uplink/downlink transmission using a configuration 6 in a frame unit. However, the configuration of the uplink/downlink may be changed through RRC signaling according to change in the network environment or the system.

In particular, the special sub-frame may include a downlink part DwPTS, a guard period GP, and an uplink part UpPTS. During the GP, both of the uplink transmission and the downlink transmission are not achieved. With respect to this, the present invention uses regions before/after the GP section of the special sub-carrier.

That is, as described above, when the down link is switched to the uplink, the TDD system may define the GP. Accordingly, the present invention uses a sub-frame just after or before the GP through the D2D communication. Accordingly, upon performing the D2D communication just after the GP, the D2D communication may be performed by N OFDM symbols as compared with uplink synchronization based on the TA. When performing D2D communication just before the GP, the D2D communication may be performed for time delay TD by N OFDM symbols as compared with downlink synchronization. In this case, N∈{0, 1, 2, . . . }.

Figure 15:
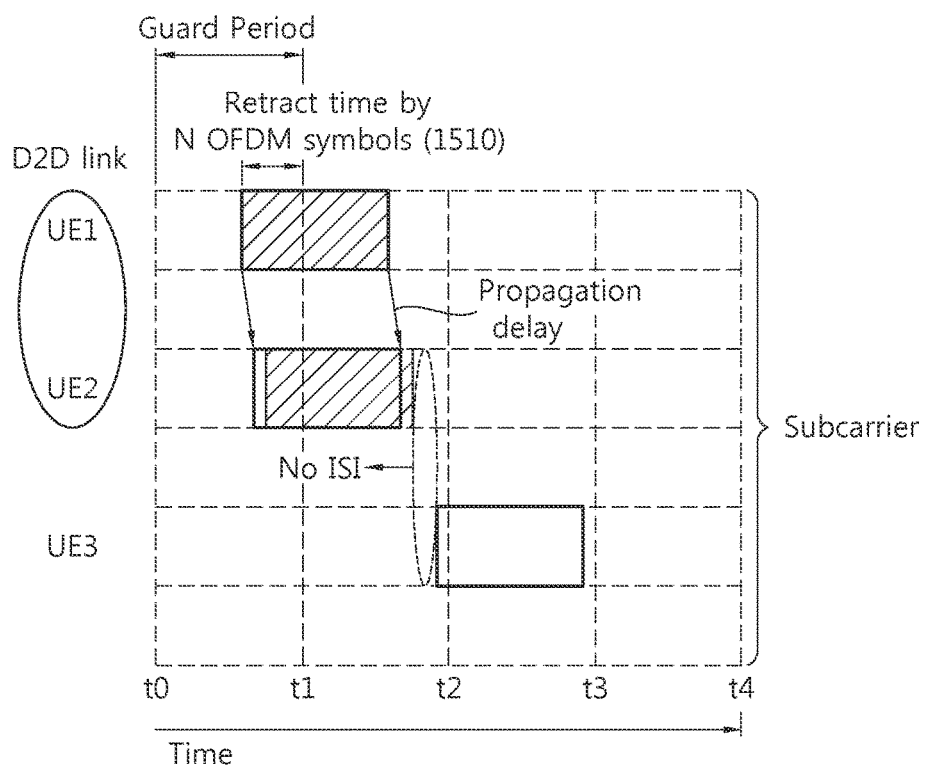
FIG. 15 and FIG. 16 are diagrams illustrating an operation for performing D2D communication by taking into consideration time delay with respect to N OFDM symbols according to another embodiment of the present invention.
Figure 16:
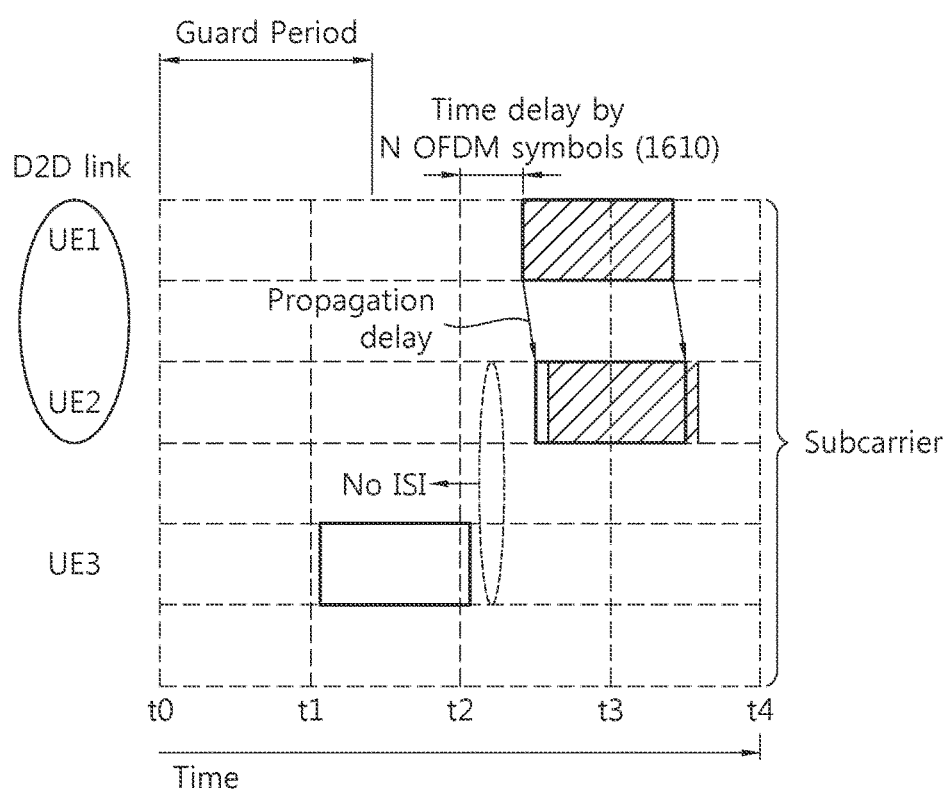

Regarding this, FIG. 15 and FIG. 16 are diagrams illustrating an operation for performing D2D communication by taking into consideration time delay with respect to N OFDM symbols according to another embodiment of the present invention.

It is assumed that FIG. 15 illustrates a situation where UE1 to UE3 perform communication using the same sub-carrier. A horizontal dotted line identifies each UE. A vertical dotted line may represent a sub-frame (a resource block or an OFDM symbol) synchronizing a time of the eNB.

Accordingly, the present invention performs D2D communication by applying TA by N OFDM symbols as compared with uplink time synchronization in an uplink sub-frame after a GP section of the special sub-frame section in order to remove interference between a symbol performing the D2D communication and a symbol performing the cellular communication (1510).

Alternatively, as illustrated in FIG. 16, the D2D communication is performed by applying time delay by N OFDM symbols as compared with downlink synchronization in a downlink sub-frame just after the GP.

In this case, performing the D2D communication includes transmitting the D2D uplink symbol to the eNB to an optional region of the sub-frame allocated for the D2D communication according to the present invention. This may include resource allocation for a D2D uplink symbol illustrated in FIG. 11 to FIG. 13.

Figure 17:
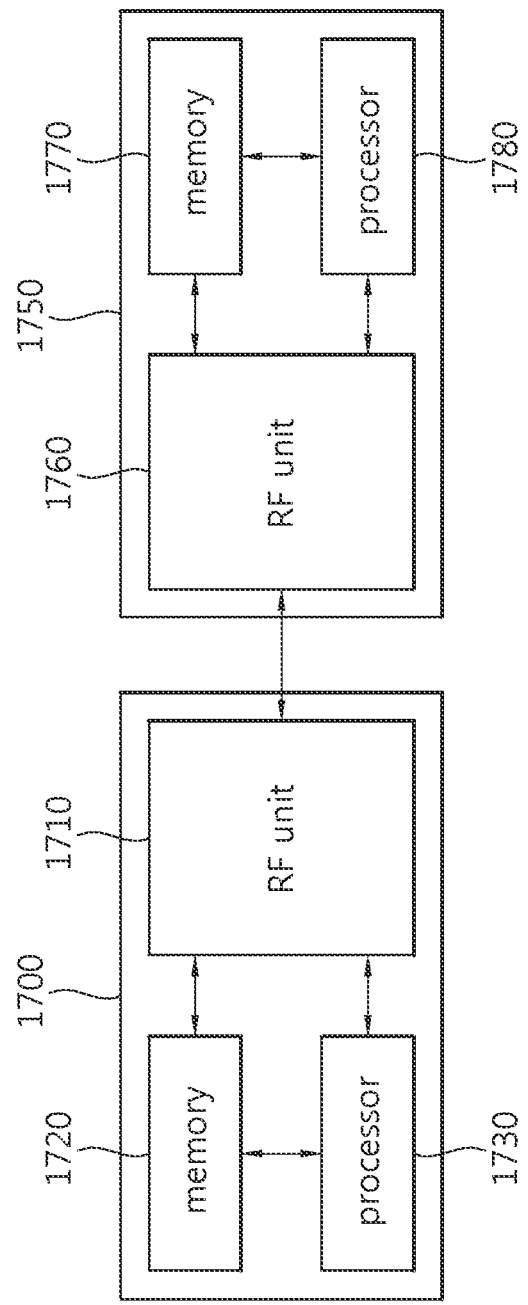
FIG. 17 is a block diagram schematically illustrating a configuration of a wireless communication system according to another embodiment of the present invention.

FIG. 17 is a block diagram schematically illustrating a configuration of a wireless communication system according to another embodiment of the present invention.

Referring to FIG. 17, the UE 170 includes a radio frequency (RF) unit 1710, a memory 1720, and a processor 1730. The RF unit 1701 is connected to the processor 1730 and transmits/receives a wireless signal.

The processor 1730 is an entity to perform functions, procedures, and methods according to the present invention, and performs an operation illustrated in FIG. 2 to FIG. 16 according to the present invention. In particular, the processor 170 according to the present invention may simultaneously or partially access the D2D communication and the cellular communication according to capability of the UE by receiving configuration information and resource allocation information indicated by a network being an upper system. The processor 1730 may communicate with other D2D UE by detecting a link performing the D2D communication without signaling of the eNB.

In particular, the processor 1730 according to the present invention confirms a resource allocated to perform the D2D communication.

The resource of the D2D communication includes an uplink transmission symbol duration having a predetermined length defined in order to minimize a symbol performing the cellular communication or a symbol by the UE in which other D2D link is configured. Alternatively, the predetermined length is changeable and may include the guard symbol. Moreover, the resource allocation may be induced by receiving an allocation period and interval (offset) of the D2D communication symbol and the cellular communication symbol. The allocation period may include information such as a length of the D2D communication symbol, a position of a start/end symbol, and a difference from the cellular communication symbol.

Accordingly, the processor 1730 controls to transmit D2D uplink control information to the eNB at a symbol duration having the predetermined length. In this case, since the D2D uplink symbol is transmitted to the eNB through the D2D communication resource, the D2D uplink symbol is not operated as interference with respect to the symbol performing other D2D communication. In this case, a value different from a value set to the symbol for the cellular communication may be set to modulation and transmission power for the D2D uplink symbol to be transmitted to the eNB. This may be changed according to configuration of the eNB.

Alternatively, the processor 1730 according to the present invention may perform the D2D communication to have time delay by N OFDM symbols in a predetermined sub-frame, that is, after the GP, based on the GP of a special sub-frame by applying the TDD scheme. In this case, the N OFDM symbol delay may be set by the eNB. Further, the TDD configuration information may be configured through RRC of the eNB.

In other words, the processor 1730 transmits and receives D2D data to and from other UE using the resource configured for the D2D communication, and provides a scheduling efficiency for a channel state and a next service by transmitting D2D uplink symbol to the eNB at a symbol having a predetermined length. Further, the D2D uplink symbol is information on service continuation of the D2D communication, and may include BSR or information on start/end. Further, the D2D uplink symbol may include information on a channel state for the D2D communication. The D2D uplink symbol may further include information on a switch request to the cellular communication. In addition, the D2D uplink symbol may include information on a transmission period of the D2D uplink symbol.

The memory 1720 is connected to the processor 1730, and includes information for supporting the overall operation of the processor 1730.

Meanwhile, the network 1750 includes an RF unit 1760, a processor 1780, and a memory 1770. The RF unit 1760 is connected to the processor 1780 and transmits/receives a wireless signal. The network may be configured so that a partial entity of the base station and a partial entity of an upper core network are partially supported according to an operation thereof.

That is, the processor 1780 of the network according to the present invention is an entity for performing functions, procedures, and methods according to the present invention, and performs an operation illustrated in FIG. 2 to FIG. 16. That is, the processor 1780 performs resource allocation by taking into consideration capability information, a service state, a channel state, and the like of the UEs in the cell. In particular, the present invention may alternately allocate resources by distinguishing a resource for D2D communication with a sub-frame for cellular communication or may report configuration with respect to power and a modulation scheme for D2D uplink symbol with respect to an optional region of the resource for D2D communication. Further, a transmission period of the D2D uplink symbol and the like may be set. Alternatively, the UE may estimate an allocation rule by providing information on allocation between the cellular communication symbol and the D2D communication symbol. For example, the present invention may provide information on an allocation length of the D2D communication resource, position of a start symbol/end symbol, and a spacing interval with a cellular communication resource.

The memory 1770 is connected to the processor 1780 and includes information for supporting an overall operation of the processor 1780.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of allocating resources in a wireless communication system, the method comprising:
   distinguishing a cellular user equipment (UE) to support cellular communication with an evolved-NodeB (eNB) from a first device-to-device (D2D) UE and a second D2D UE to support D2D communication; and
   alternately allocating a first resource for the cellular UE and a second resource for the first D2D UE and the second D2D UE to one frame,
   wherein the second resource comprises a D2D uplink symbol including control information for transmitting, by the first D2D UE, a request and a state of the D2D communication to the eNB,
   wherein the second resource is defined by a combination of L orthogonal frequency division multiplexing (OFDM) symbols and M sub-carriers,
   wherein the D2D uplink symbol is defined by a length including first x OFDM symbols of the L OFDM symbols and last y OFDM symbols of the L OFDM symbols,
   wherein the control information transmitted in the first x OFDM symbols and the last y OFDM symbols is not decoded by the second D2D UE,
   wherein the second resource is located after a guard period having a predetermined length, and the guard period configures a special sub-frame defined according to a preset uplink-downlink configuration when applying a time division duplex (TDD),
   wherein the D2D communication is performed by applying time alignment as much as the D2D uplink symbol in an uplink subframe after the guard period, and
   wherein the D2D communication is performed by applying time delay as much as the D2D uplink symbol in a downlink subframe after the guard period.

2. The method of claim 1, wherein the second resource comprises a downlink resource and a selective uplink resource for data transmission/reception of the first D2D UE and the second D2D UE, and an uplink resource for the D2D uplink symbol.

3. The method of claim 1, wherein the D2D uplink symbol further comprises at least one of a guard OFDM symbol having a length g1 and a guard OFDM symbol having a length g2, and the length g1 is equal to or different from the length g2, and
   wherein the guard OFDM symbol having the length g1 is located before the first x OFDM symbols, and the guard OFDM symbol having the length g2 is located after the last y OFDM symbols.

4. The method of claim 1, wherein transmission power and a modulation scheme different from transmission power and a modulation scheme of the first resource are configured in the second resource.

5. The method of claim 1, wherein the D2D uplink symbol comprises D2D control information (CI) on whether to continue the D2D communication or information necessary to allocate the second resource.

6. The method of claim 5, wherein the D2D CI on whether to continue the D2D communication comprises buffer status report (BSR) information or information on start/end for the D2D communication, and when there is a plurality of links for the D2D communication, the buffer status information BSR or the information on start/end for the D2D communication are configured corresponding to the D2D links.

7. The method of claim 5, wherein the information necessary to allocate the second resource comprises channel information on a configured D2D link or channel information of a candidate link being a D2D link to be configured, and
   the channel information comprises at least one of a channel quality indicator, a preceding matrix index, a rank indicator, or a sounding reference signal (SRS).

8. The method of claim 1, wherein the D2D uplink symbol is transmitted to the eNB through a handover request procedure by the first D2D UE.

9. The method of claim 8, wherein the D2D uplink symbol comprises a management result of a D2D link configured through the handover request procedure or information for estimating a channel state.

10. An apparatus for allocating resources in a wireless communication system, the apparatus comprising:
   a transceiver configured to transmit and receive a wireless signal; and
   a processor connected to the transceiver, and configured to:
      distinguish a cellular user equipment (UE) to support cellular communication with an evolved-NodeB (eNB) from a first device-to-device (D2D) UE and a second D2D UE to support D2D communication, and
      alternately allocate a first resource for the cellular UE and a second resource for the first D2D UE and the second D2D UE to one frame,
   wherein the second resource comprises a D2D uplink symbol including control information for transmitting, by the first D2D UE, a request and a state of the D2D communication to the eNB,
   wherein the second resource is defined by a combination of L orthogonal frequency division multiplexing (OFDM) symbols and M sub-carriers,
   wherein the D2D uplink symbol is defined by a length including first x OFDM symbols of the L OFDM symbols and last y OFDM symbols of the L OFDM symbols,
   wherein the control information transmitted in the first x OFDM symbols and the last y OFDM symbols is not decoded by the second D2D UE,
   wherein the second resource is located after a guard period having a predetermined length, and the guard period configures a special sub-frame defined according to a preset uplink-downlink configuration when applying a time division duplex (TDD),
   wherein the D2D communication is performed by applying time alignment as much as the D2D uplink symbol in an uplink subframe after the guard period, and
   wherein the D2D communication is performed by applying time delay as much as the D2D uplink symbol in a downlink subframe after the guard period.

* * * * *